P. SYNNESTVEDT.
MOTOR VEHICLE.
APPLICATION FILED MAR. 12, 1907. RENEWED OCT. 24, 1912.

1,064,259.

Patented June 10, 1913.

P. SYNNESTVEDT.
MOTOR VEHICLE.
APPLICATION FILED MAR. 12, 1907. RENEWED OCT. 24, 1912.

1,064,259.

Patented June 10, 1913.

WITNESSES

INVENTOR

UNITED STATES PATENT OFFICE.

PAUL SYNNESTVEDT, OF PITTSBURGH, PENNSYLVANIA.

MOTOR-VEHICLE.

1,064,259.  Specification of Letters Patent.  Patented June 10, 1913.

Application filed March 12, 1907, Serial No. 361,938. Renewed October 24, 1912. Serial No. 727,621.

*To all whom it may concern:*

Be it known that I, PAUL SYNNESTVEDT, a citizen of the United States, residing at Pittsburgh, in the county of Allegheny and State of Pennsylvania, have invented certain new and useful Improvements in Motor-Vehicles, of which the following is a specification.

The invention relates to motor vehicles, and has for its objects; to provide a supporting frame or body of a construction in which a maximum strength is obtained from the material used, and in which provision is made for convenient arrangement of wires; to provide a construction in which the weight of the batteries and of the motor is properly distributed with relation to the rear axle; to provide a supporting frame for the motor of an improved construction in which provision is made for secure and positive adjustment of the motor with relation to the rear axle; to provide a supporting frame for the motor adapted to permit of the removal of the motor parts without detaching the motor casing from the supporting frame; to provide a reduction gear complete upon the motor axle, and in which the arrangement is compact and effective, and easily protected from dirt and dust, and to provide a construction whereby the drive shaft is effectively supported at all points and protected by the arrangement of the bearings from undue bending strains. With these and other objects in view, I have illustrated one form of the invention in the accompanying drawings, in which—

Figure 1:
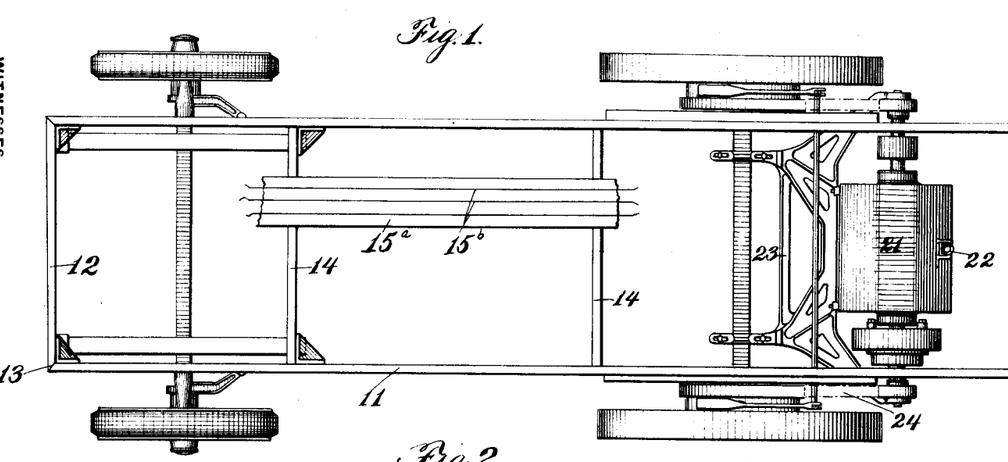
Figure 1 is a plan view of the frame work of the vehicle, showing the arrangement of the batteries and motor.
Figure 2:
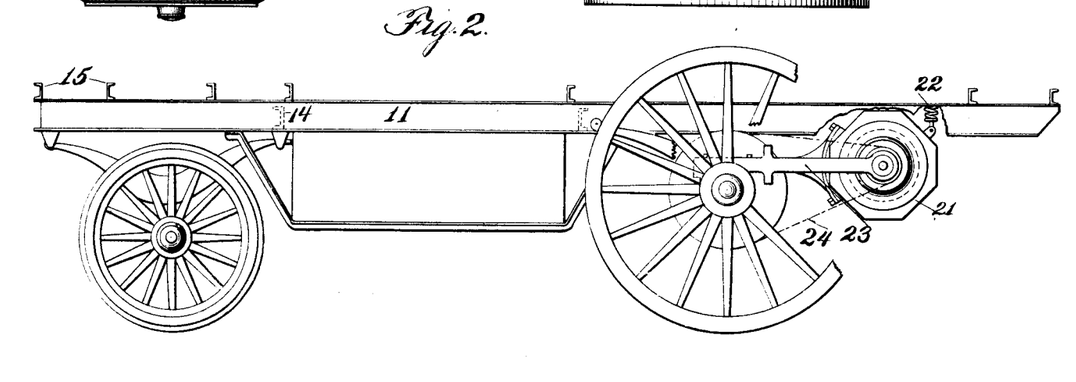
Figure 2 is a side view of the vehicle body.
Figure 8:
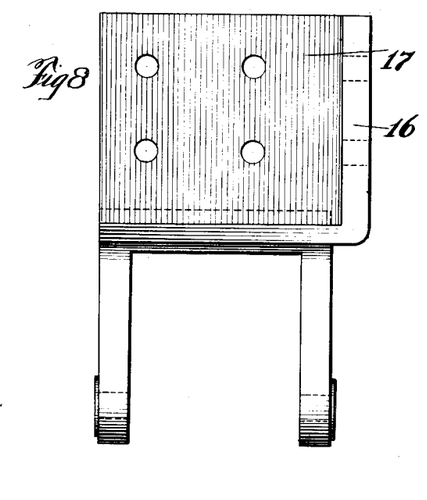
Figure 8 is an end view of the spring bracket.
Figure 9:
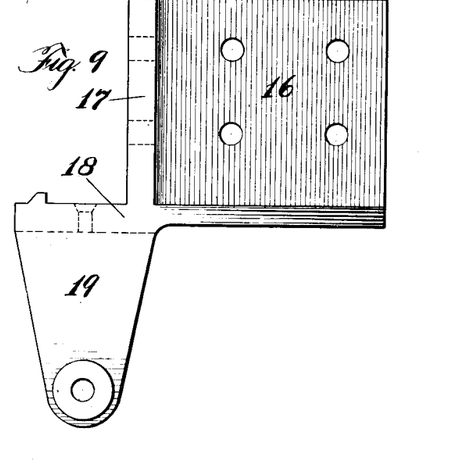
Figure 9 is a side view thereof.
Figure 10:
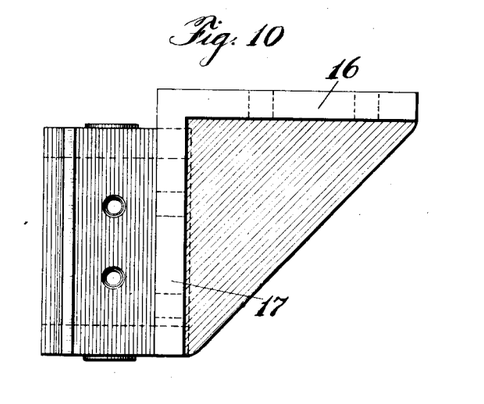
Figure 10 is a plan view of such bracket.

As shown in Figures 1 and 2, the framework of the vehicle is composed of channels 11 and 12 placed with their flanges outwardly, and mitered at their adjoining edge at 13. To stiffen the longitudinal members 11, intermediate their ends, the transverse channels 14 are used. Two of these are shown, but any desired number may of course be used. As the lateral strain on these beams is less than the strain on the members 11 and 12, such members may be of less depth than the side members, as indicated by the dotted lines in Figure 2. The cross beams 14 are placed with their bottom edges on substantially the level of the lower edges of the beams 11, so that their top edges are below the level of the top of the members 14, and the space between the bottoms of the floor members 15 and the tops of the members 11 forms a convenient recess for running the wire board 15$^a$ carrying the wires 15$^b$ from the front to the back of the machine. At the juncture of the beams 11 and 12 and 11 and 14 brackets are provided, which brackets project below the bottom of the beams as shown in Figure 2, and constitute members for holding the ends of the springs. These brackets are shown in detail in Figures 8, 9, and 10. The sides 16 and 17 fit against the sides of the beams 11 and 14, while the portion 18 projects out in front and engages the bottom of the channel to which it may be bolted. The sides 16 and 17 of the brackets are adapted to be bolted to the members 11 and 14 or 11 and 12, as the case may be, and the downwardly projecting portion 19 is of the usual type, and is adapted to carry the ends of the springs. It will be seen that the bracket constitutes effective means for at the same time, fastening the abutting beams together and forming a spring support.

The arrangements of the battery supporting means and the motor 21 are clearly shown in Figure 2. By placing the battery at the front of the rear axle and the motor at the rear, an advantageous distribution of weight on such rear axle is secured, and proper space is provided for the placement of the parts. The motor is spring-supported at 22, and is also supported from the axle, rotatably, by the frame 23. The drive is by means of a flexible connection 24, as a chain, and the centers of the two sprockets may be adjusted by a construction of the frame hereinafter to be more particularly described.

Figure 3:
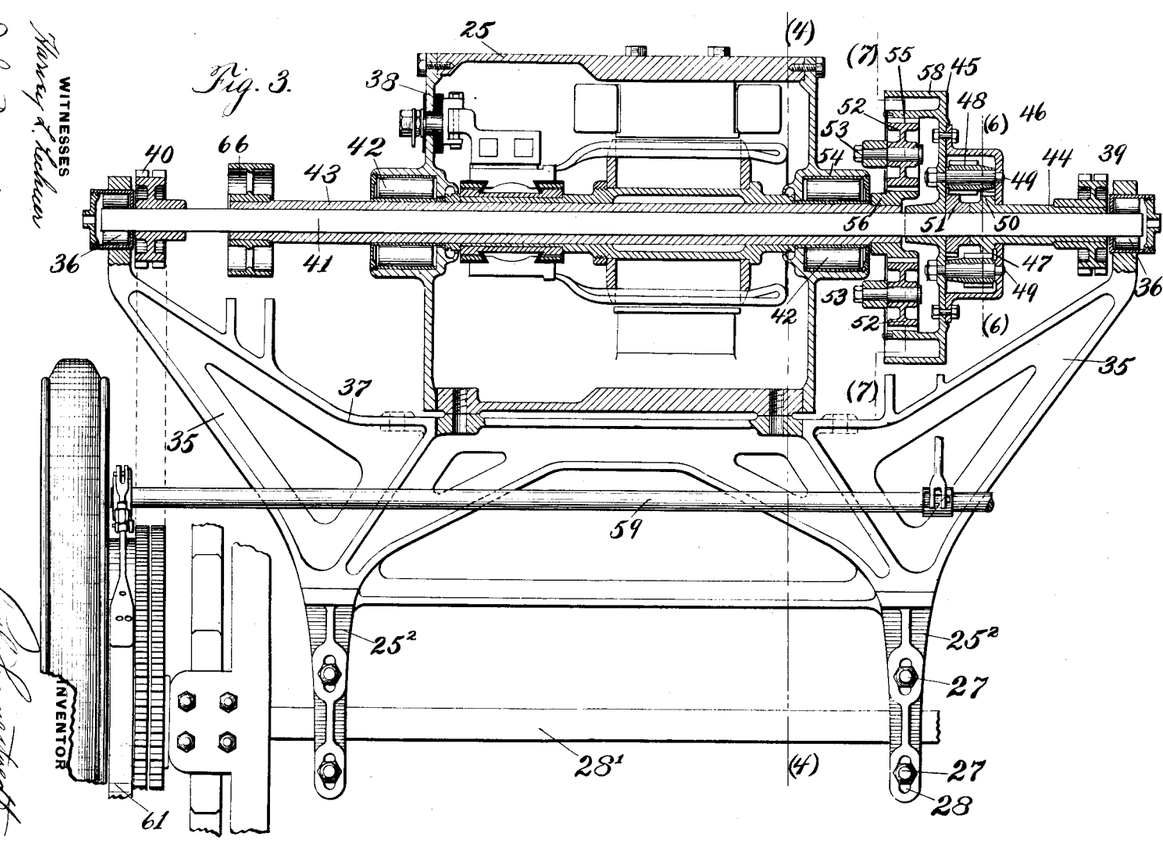
Figure 3 is a plan view partially in section through the motor and reduction gear.
Figure 4:
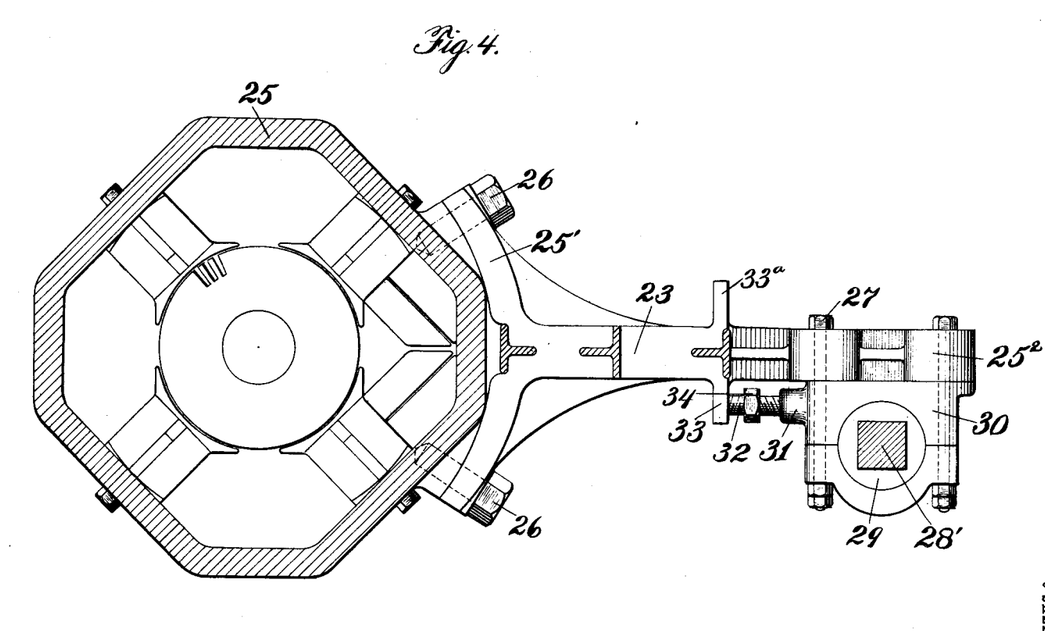
Figure 4 is a transverse section through the motor on the line (4) (4) of Figure 3.

Figures 3 and 4 show in detail the construction of the supporting frame 23, and also the arrangement of the driving mechanism. As illustrated in these two figures, 25 is a motor casing of any improved construction, which motor is as before set forth, supported on one side by springs from the body of the vehicle, and on the other side by the frame 23. The frame 23 is connected to the side of the motor by the T-shaped portion 25' provided with the bolts 26, and the other end of the frame is provided with two arms 25² which are connected to the axle of the vehicle by means of the bolts 27 passing through slots 28 in the arms 25². This bolt and slot connection permits of a movement of the motor toward and away from the axle to provide for the adjustment of the chain. As shown in Figure 4, the axle 28' is of angular shape, and is surrounded by a journal member 29 to which the split bearing 30 is secured by the two bolts 27. The upper part of the bearing is provided with the lug 31 into which the reversely threaded bolt 32 takes at one end. The other end of the threaded bolt is threaded into the part 33 projecting downwardly from the frame 23. The nut 34 secured to the bolt constitutes the means whereby the bolt may be turned in order to move the frame 23 relative to the axle 28' when the bolts 27 have been loosened. It will be noted that by this arrangement provision is made for securing the parts 23 and 28 in fixed relation by means of the bolts 27 which may be screwed up tightly, and that the bolt 32 constitutes an additional holding means, and also serves as a convenient adjusting device. In order to provide for the use of the member 23 below the axle 28', instead of above it, the lug 33' is provided, which lug is similar in all respects to the lug 33 and is adapted to coöperate with the bolt 32 in the same way when the part 23 is used below the axle. When the part 23 is used below the axle it is of course necessary to reverse the part 30. The frame as shown, is made in skeleton form for the purpose of lightness, and provided with various cross braces to stiffen it. This arrangement for lightening and stiffening may be varied to suit conditions. The frame is provided with the diverging arms 35 adapted to journal the ends of the motor shaft in the roller bearings 36. The angle of these arms at 37 is so placed that when the removable ends 38 of the motor are taken out, the inner parts of the motor may be moved out endwise without detaching the motor casing from the framework 23, in other words, if desired, the motor parts may be removed for repairs without taking the casing off the vehicle, thereby saving the usual labor incident to removal of the entire motor and the consequent re-adjustments otherwise necessary. The motor casing 25 has, as indicated in Figure 3 the same internal diameter for all machined parts, viz., the central portion to which the field magnets are attached and the ends in which the removable parts 38 are fitted. This facilitates the machining of the interior as a bearing bar of one diameter can be sent through to do all the work at one operation. As shown in Figure 4, the axle 28' is below the arms 25² but they may be reversed to suit conditions and if desired the arrangement may be modified so that the axle is above the arms 25¹.

Figure 5:
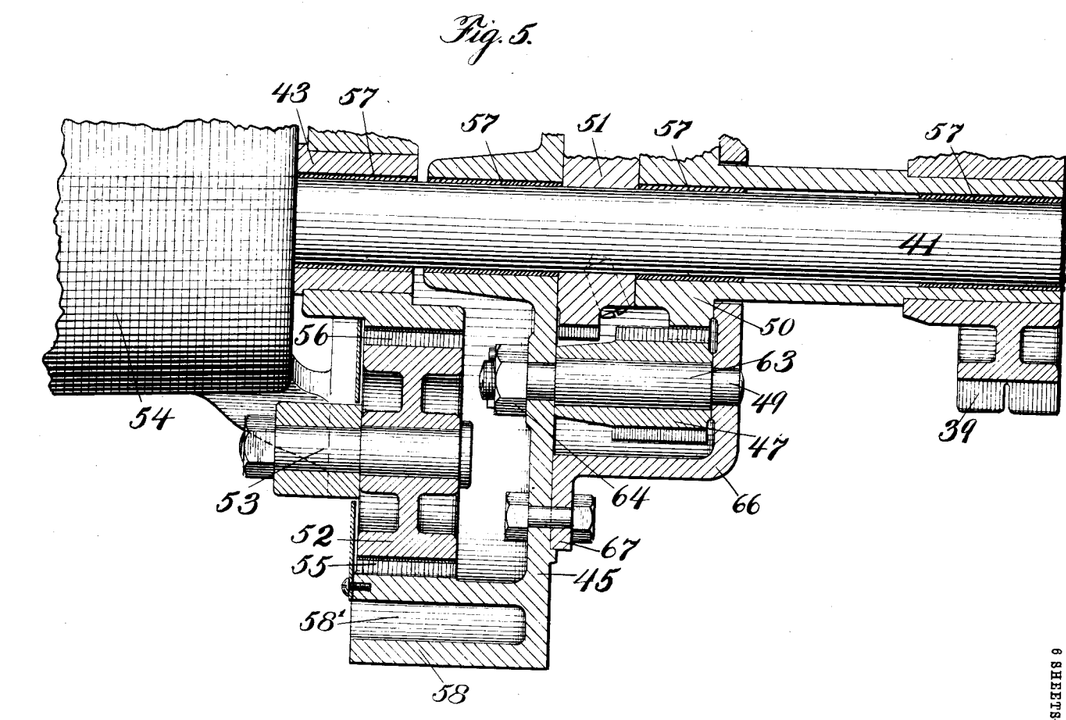
Figure 5 is a detail section enlarged to show the construction of the reduction gear and differential gearing more clearly.
Figure 6:
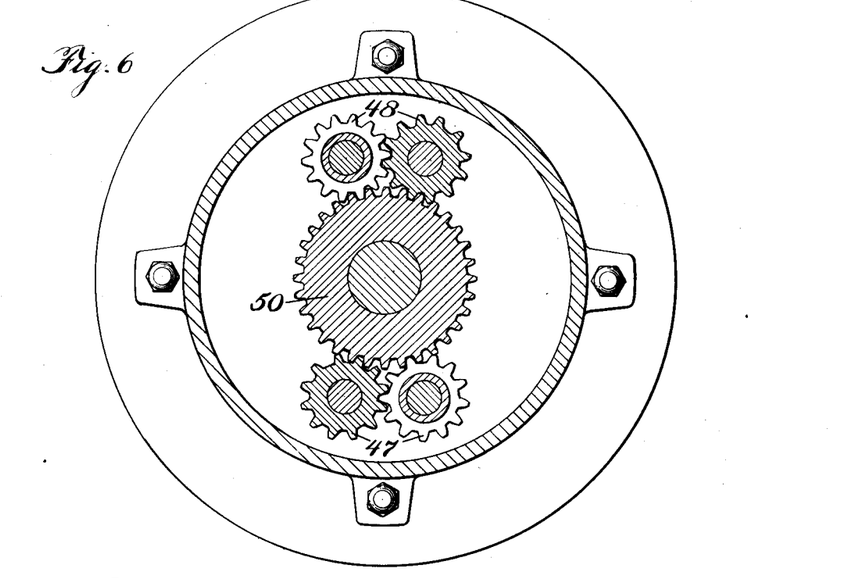
Figure 6 is a section on the line (6) (6) of Figure 3, which shows the arrangement of gears in the differential gearing.
Figure 7:
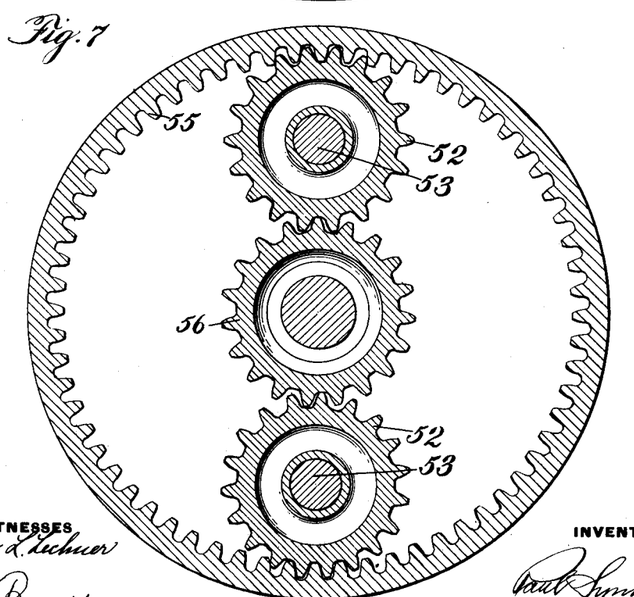
Figure 7 is a section on the line (7) (7) of Figure 3, which shows the arrangement of gears in the reduction gearing.

The driving mechanism constitutes an important part of my invention, and is most clearly shown in Figure 3 taken in connection with the enlarged detail shown in Figures 5, 6 and 7. As is usual in motor vehicles, the vehicle wheels are each provided with a driving sprocket, which sprockets have chain connection to driving sprockets on the motor shaft, between which driving sprockets a differential gear is provided. As shown in Figure 3, 39 and 40 are the drive sprockets on the motor shaft 41. This motor shaft 41 is supported at its two ends by the roller bearings 36, and intermediate such ends by the roller bearings 42 secured to the removable motor casing ends 38. Provision is thus made for the proper support of the shaft along its entire length, and each sprocket drive is supported at two points on opposite sides thereof and comparatively adjacent. The sprocket 40 is keyed to the shaft 41. Outside of the motor shaft 41 is the drive sleeve 43, to which the motor armature is secured, and which is therefore the primary driving element of the construction. A second sleeve 44 independent of the first sleeve is mounted upon the right hand end of the shaft 41, and to this sleeve is keyed the sprocket drive 39. The reduction gear and the differential gear hereinafter described and shown to the right of the motor in Figure 3 constitutes the connecting train of gearing between the drive sleeve 43 and the shaft 41 and the sleeve 44. The train of gearing includes casing 45 intermediate the sleeve 43 and sleeve 44 which casing is revolubly mounted upon the shaft 41 and carries the shafts and casing of the differential gearing 46. This differential gearing 46 is in the main of a common type, and consists as shown in Figures 3, 5 and 6 of the two pairs of gears 47, 47, and 48, 48, mounted upon the shafts 49, which are carried by the casing 45, and one of each pair meshes with the gear 50 secured to the sleeve 44 and the other of each pair meshes with the gear 51 keyed to the shaft 41, so that one gear of each set drives the sprocket 39 on the sleeve 44 and the other two gears drive the sprocket 40 which is keyed to the motor shaft 41. In order to effect the desired reduction in speed the arrangement of gears shown to the left of the differential gearing and in detail in Figures 5 and 7 is provided. This gearing consists of a pair of pinions 52 mounted on axes 53, which axes are secured in bearings projecting from the casing 54 of the roller bearing 42, of the internal gear 55 secured on the revoluble casing 45 and the gear 56 keyed to the driving sleeve 43. From the above construction it will be apparent that when the drive sleeve 43 is actuated by means of the motor armatures the gear 56 in revolved, which motion is transmitted through the pinions 52 to the internal gears 55, thereby revolving the casing 45 which is journaled on the shaft 41. The revolution of the casing 45 carries with it the axes of the differential pinions 47 and 48, a part of which engage the gear 51 keyed to the shaft 41 thereby actuating the sprocket 40, and the other of which engage the gear 50, thereby operating the sleeve 44 and the sprocket 39. It will be seen therefore that two reductions of speed may be secured, the first by the difference in size between the sprockets on the motor shaft and vehicle wheels, and the second by means of the reduction gearing 55, 52, 56. As the motor shaft 41 moves relatively to the sleeve 43, sleeve 44 and casing 45, the points of contact of the shaft with these members are provided with bushings 57, as clearly shown in Figure 5. Other bushings between the shaft 41 and sleeve 44 may be provided as required. As shown in Figure 7, two pinions 52 are used in the reduction gear, but it is apparent that if desired this arrangement might be modified to use any number of intermediate pinions desired. The dimensions of the gears to secure any desired reduction might also be varied. Also as described and illustrated, the supports for the axes of the pinions 52 are secured to the casing 54 of the roller bearing 42. It will be apparent that if desired the support might be modified so as to extend from some other point than the part 54, as for instance from the diverging arms 35. As shown in Figures 3 and 5, the casing 45 is provided with an outer portion 58 separated from the inner periphery of such casing by a slight distance. It is proposed to utilize this portion 58 as a braking surface for a band brake to be applied in the usual way from the brake shaft 59, the operative connections for which extend to the front of the vehicle in the usual way. As shown the braking surface 58 is separated from the base of the gear 55 by an air space 58' adapted to prevent undue heating of the gear. If desired, a brake may be also applied to the drive sleeve 43 by means of the drum 66 to which the band may be applied from the shaft 59 in the usual way. The brake shaft 59 may also be connected to the usual wheel brake band 61, (see Figure 3). It will be apparent that the reduction gear as just described constitutes a very compact and efficient mechanism, easily protected from dirt and dust and if so desired can be made to run in oil.

As previously stated, the differential gearing is broadly old, but certain features thereof are considered new, one of which features consist in the means for mounting the pinions 47 and 48. These pinions are mounted on the bearing pins 49. These pins are provided with a central bearing portion 63 on which the gear is adapted to turn, and with reduced end portions having shoulders for bearing against the casing. The left hand end of the bearing pin as shown in Figure 5 is screw threaded and provided with a holding nut 64 and a cotter 65. It will be apparent that the bearing pin is securely held at both ends and that the arrangement affords a convenient and effective means for journaling the gear. The general arrangement whereby the differential is mounted on the through shaft 4 and whereby the supporting casing 66 supports the gears is also novel and advantageous. The part 45 against which the casing 66 is secured is turned down to form a recess as indicated at 67, thereby insuring an exact central portion of the casing 66 and a proper alinement of the axis of the gears. For disassembling the arrangement is convenient as any gear in the differential may be removed without disturbing any of the others by simply taking off the casing 66 and slipping off the desired gears.

I have heretofore set forth the preferred form of my invention, but it will be apparent to those skilled in the art that various changes and modifications as to form and proportion may be made without departing from the spirit of the invention, which invention is set forth in terms coincident with its breadth in the following claims.

Having thus described my invention and illustrated its use, what I claim as new and desire to secure by Letters Patent, is the following:

1. In combination, a supporting body, a rear axle, a single motor to the rear of the axle rotatably secured on one side of the axis of such motor drive and spring supported from the body at the other side of such axis, a drive shaft extending through the motor and a chain drive from each end thereof direct to the rear wheels.

2. In combination, a motor casing, a supporting frame therefor comprising a T-shaped portion for engaging the motor casing and spread arms for journaling the ends of the motor axle.

3. In combination, a motor casing, a supporting frame therefor comprising a T- shaped portion for engaging the motor casing and spread arms for journaling the ends of the motor axle, and axle engaging arms provided with slots and extending at substantially a right angle to the T.

4. A supporting frame for a motor comprising an integral frame having arms for supporting the ends of the motor shaft and an intermediate portion adapted to be secured to the motor casing.

5. A supporting frame for a motor comprising an integral frame having arms for engaging the ends of the motor shaft, other arms for engaging the vehicle axle and an intermediate portion adapted to be secured to the motor casing.

6. A supporting frame for a motor comprising a portion for engaging the motor casing, arms for engaging the ends of the motor shaft, and axle engaging means provided with means whereby the frame may be adjusted relative to the axle.

7. A supporting frame for a motor comprising a portion for engaging the motor casing, arms for engaging the ends of the motor shaft, and axle engaging arms provided with slots whereby the arms may be adjustably bolted to the vehicle axle.

8. In combination, a supporting frame for a motor comprising a motor engaging portion and an axle engaging portion provided with a slot and a screw engaging portion, an axle bearing provided with a bolt hole in line with the slot, a bolt passing through the slot and bolt hole and an adjusting screw adapted to engage the bearing and the screw engaging portion.

9. In combination, a supporting frame for a motor comprising a motor engaging portion and an axle engaging portion provided with spaced slots and a screw engaging portion, a divided axle bearing provided with bolt holes in line with the slots, bolts passing through the opposite sides of the axle bearing for securing the parts of the bearing together and holding the axle engaging portion to the journal and an adjusting screw adapted to engage the journal and the screw engaging portion on the supporting frame.

10. In combination, a motor casing provided with a removable end, a supporting frame provided with arms for journaling the ends of the motor shaft and spaced apart such a distance that the parts of the motor may be removed end-wise without detaching the casing from the frame.

11. In combination, a motor provided with a shaft, a motor casing provided with bearings for the shaft, a supporting frame provided with spaced arms and bearings for the ends of the shaft in the ends of the arms.

12. In combination, a motor provided with a shaft, a motor casing provided with bearings for the shaft, a supporting frame provided with spaced arms and bearings for the ends of the shafts in the ends of the arms, and driving means on the shaft between bearings.

13. In combination, a motor provided with a shaft, a motor casing provided with bearings for the shaft, a supporting frame provided with spaced arms and bearings for the ends of the shafts in the ends of the arms, and a reduction gear on the shaft between a casing bearing and an arm bearing.

14. In combination, a motor provided with a shaft, a motor casing provided with bearings for the shaft, a supporting frame provided with spaced arms and bearings for the ends of the shafts in the ends of the arms, and a reduction gear and a driving gear on the shaft between a casing bearing and an arm bearing.

15. In combination, in a vehicle drive, a motor provided with a shaft, a motor casing provided with bearings for the shaft, a supporting frame provided with spaced arms and bearings for the ends of the shafts in the ends of the arms, and a reduction gear and a drive gear for one vehicle wheel on the shaft between one of the casing bearings and an arm bearing, and a drive gear for the other vehicle wheel on the shaft between the other casing and arm bearings.

16. A vehicle drive comprising a motor provided with an axial drive sleeve and a shaft therein having a flexible driving means, and a reduction gear between the sleeve and shaft.

17. A vehicle drive comprising a motor provided with an axial drive sleeve, a shaft therein carrying at one end a flexible driving means, a second sleeve on the other end of the shaft carrying a second flexible driving means and a reduction gear and a differential driving means interposed between the drive sleeve and the shaft and second sleeve.

18. In combination, a drive sleeve, a drive shaft therein provided with a drive gear, a gear secured to the sleeve, a pinion mounted upon a stationary axis and meshing with such last gear, an internal gearing rotatably mounted on the drive shaft and meshing with the pinion, and connections between the internal gear and the drive shaft whereby the drive shaft may be rotated.

19. In combination, a drive sleeve, a drive shaft therein provided with a drive gear, a gear secured to the sleeve, a pinion mounted upon a stationary axis and meshing with such last gear, an internal gear rotatably mounted on the drive shaft and meshing with the pinion and carrying the shafts of a differential gear, a sleeve carrying the other drive gear, and differential gearing whereby the rotation of the differential shafts rotates the drive shaft and the last mentioned sleeve.

20. In combination, a drive sleeve, a drive shaft therein provided with a drive gear, a gear secured to the sleeve, a plurality of pinions mounted upon stationary axes and meshing with such last gear, an internal gear rotatably mounted on the drive shaft and meshing with the plurality of pinions and connections between the internal gear and the drive shaft whereby the drive shaft may be rotated.

21. In combination, a drive sleeve, a drive shaft therein provided with a drive gear, a gear secured to the sleeve, a pinion mounted upon a stationary axis and meshing with such last gear, an internal gear rotatably mounted on the drive shaft and meshing with the pinion, a braking surface on such gear, connections between the internal gear and the driving shaft whereby the drive shaft may be rotated, and a band brake for engaging the braking surface on the internal gear.

22. In combination, a motor provided with a drive sleeve, a drive shaft therein projecting from both ends of the motor and having a drive gear on one side of the motor, a gear secured to the sleeve at the other side of the motor, a pinion mounted upon a stationary axis and meshing with such last gear, an internal gear rotatably mounted on the drive shaft and meshing with the pinion, a second sleeve on the shaft carrying the other drive gear, and differential connections between the internal gear, the drive shaft, and the second sleeve.

23. In combination, a motor provided with a drive sleeve, a drive shaft therein projecting from both ends of the motor and having a drive gear on one side of the motor, a gear secured to the sleeve at the other side of the motor, a plurality of pinions mounted upon stationary axes and meshing with such last gear, an internal gear rotatably mounted on the drive shaft and meshing with the plurality of pinions a second sleeve on the shaft carrying the other drive gear, and differential connections between the internal gear, the drive shaft, and the second sleeve.

24. In combination, a motor casing provided with a machined central portion and machined end portions, the diameter of all of which machined portions is the same, and end closing sections having machined edges adapted to fit the machined end portions of the casing.

In testimony whereof I have hereunto signed my name in the presence of the two subscribed witnesses.

PAUL SYNNESTVEDT.

Witnesses:
F. E. GAITHER,
ARCHWORTH MARTIN.